(12) United States Patent
Heyman

(10) Patent No.: US 7,266,612 B1
(45) Date of Patent: Sep. 4, 2007

(54) NETWORK HAVING OVERLOAD CONTROL USING DETERMINISTIC EARLY ACTIVE DROPS

(75) Inventor: Daniel Paul Heyman, Lincroft, NJ (US)

(73) Assignee: AT&T Corp., New York, NY (US)

( * ) Notice: Subject to any disclaimer, the term of this patent is extended or adjusted under 35 U.S.C. 154(b) by 906 days.

(21) Appl. No.: 10/076,890

(22) Filed: Feb. 14, 2002

(51) Int. Cl.
*G06F 15/173* (2006.01)
*H04L 1/00* (2006.01)

(52) U.S. Cl. .................. 709/232; 709/235; 709/238; 370/229; 370/232; 370/235

(58) Field of Classification Search ........ 370/228–235; 709/238, 232–235
See application file for complete search history.

(56) References Cited

U.S. PATENT DOCUMENTS

| | | | | |
|---|---|---|---|---|
| 4,849,968 A | * | 7/1989 | Turner | 370/232 |
| 5,140,584 A | * | 8/1992 | Suzuki | 370/235 |
| 5,434,848 A | * | 7/1995 | Chimento et al. | 370/232 |
| 5,487,061 A | * | 1/1996 | Bray | 370/252 |
| 5,546,389 A | * | 8/1996 | Wippenbeck et al. | 370/412 |
| 5,553,061 A | * | 9/1996 | Waggener et al. | 250/491.1 |
| 5,629,936 A | * | 5/1997 | Lee et al. | 370/230 |
| 5,764,641 A | * | 6/1998 | Lin | 370/412 |
| 5,764,740 A | | 6/1998 | Holender | |
| 5,787,081 A | | 7/1998 | Bennett et al. | |
| 5,790,524 A | | 8/1998 | Bennett et al. | |
| 5,822,300 A | | 10/1998 | Johnson et al. | |
| 6,064,651 A | | 5/2000 | Rogers et al. | |
| 6,072,800 A | | 6/2000 | Lee | |
| 6,091,709 A | | 7/2000 | Harrison et al. | |
| 6,134,218 A | | 10/2000 | Holden | |
| 6,134,239 A | | 10/2000 | Heinänen et al. | |
| 6,145,010 A | | 11/2000 | Hiscock et al. | |
| 6,160,793 A | | 12/2000 | Ghani et al. | |
| 6,167,445 A | * | 12/2000 | Gai et al. | 709/223 |
| 6,169,740 B1 | * | 1/2001 | Morris et al. | 370/397 |
| 6,208,619 B1 | * | 3/2001 | Takeuchi | 370/229 |
| 6,215,766 B1 | | 4/2001 | Ammar et al. | |
| 6,215,769 B1 | | 4/2001 | Ghani et al. | |
| 6,407,999 B1 | * | 6/2002 | Olkkonen et al. | 370/389 |
| 6,463,068 B1 | * | 10/2002 | Lin et al. | 370/414 |
| 6,469,982 B1 | * | 10/2002 | Henrion et al. | 370/230 |
| 6,570,876 B1 | * | 5/2003 | Aimoto | 370/389 |
| 6,680,908 B1 | * | 1/2004 | Gibson et al. | 370/229 |
| 6,826,150 B1 | * | 11/2004 | Bhattacharya et al. | 370/230 |
| 6,829,224 B1 | * | 12/2004 | Goldman et al. | 370/252 |
| 6,920,109 B2 | * | 7/2005 | Yazaki et al. | 370/230.1 |
| 7,061,862 B2 | * | 6/2006 | Horiguchi et al. | 370/230 |
| 2001/0026555 A1 | * | 10/2001 | Cnodder et al. | 370/412 |
| 2002/0003777 A1 | * | 1/2002 | Miyamoto | 370/236 |
| 2004/0071086 A1 | * | 4/2004 | Haumont et al. | 370/230 |

* cited by examiner

*Primary Examiner*—William Vaughn
*Assistant Examiner*—Ramsey Refai

(57) ABSTRACT

An overload control mechanism in a packet-based network includes computing thresholds for respective classes of traffic so that packets of a given class are discarded when the number of buffered packets for that class exceeds the associated threshold.

8 Claims, 8 Drawing Sheets

NETWORK HAVING OVERLOAD CONTROL USING DETERMINISTIC EARLY ACTIVE DROPS

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to communication systems and, more particularly, to packet-based communication systems.

BACKGROUND OF THE INVENTION

As is known in the art, packet-based communication systems include a series of interconnected devices, such as routers, for enabling point-to-point data exchanges. The failure of network elements and/or traffic surges can cause packet routers to receive traffic at a higher rate than the bandwidth of the link on the output interface to which the traffic is routed. This can result in the build-up of packets in a buffer contained in the router. If the overload condition persists long enough, the buffer can overflow and degrade end-user performance.

So-called overload controls can be used to selectively discard packets so that the "most important" packets are delivered to the extent possible. Two examples of most important packets are those containing network control information and those from end-users who pay a premium for special treatment.

Quality of service (QoS) differentiation of packets is the basis for several known packet-network services. In typical QoS schemes, packets are marked according to their class of service (which is a measure of "value"). An overflow control algorithm uses this information to discard the "least valuable packets" first. It may be desirable to avoid discarding all of the least valuable packets in order to retain end user goodwill. The capability of current routers to maintain throughput-by-class under overload is primarily provided in an algorithm called weighted random early discard (WRED).

However, there are drawbacks to using the WRED algorithm for overload control. More particularly, when WRED is configured to ensure that the most valuable packets are protected from being discarded in the case where the overload is caused by an excess of low-value packets, the low-value packets receive an undesirably small throughput when the overload is caused by high-value packets. That is, class 1 traffic is protected from class 2 overloads but class 2 traffic is not protected from class 1 overloads. While so-called smoothing may avoid preventive discards on small traffic bursts, WRED does not avoid them when the queue empties after a large burst. Further, probabilistic dropping in WRED, which is designed to avoid consecutive packet drops from the same end user, is not needed on backbone routers since these routers serve a relatively large number of users. In addition, the performance of WRED is not easily predicted, so that setting the control parameters to achieve performance objectives is challenging.

Additional known active queue management ways of providing preferential services by class when packets are placed in a single queue include priority queuing (PQ) and Weighted Fair Queuing (WFQ). Deficit Round Robin (DRR) is a scheduling algorithm that provides preferential service by class when packets from different classes are placed in separate queues. However, priority queuing cannot provide bandwidth guarantees to all classes. While Weighted Fair Queuing provides bandwidth guarantees to all classes by controlling the packet processing schedule, its computational requirements grow with the number of connections so it may not scale to backbone routers, which handle a very large number of connections. And Deficit Round Robin applies to router architectures that place packets from different classes into different queues, so it cannot be used in routers with a single queue for all packets. Another scheduling algorithm is described in Clark and Fang, "Explicit Allocation of Best-Effort Packet Delivery Service," *IEEE/ACM Transactions on Networking*, Vol. 6, No. 4, August 1998, which is incorporated herein by reference.

These existing overload control algorithms provide only limited levels of performance and do not enable users to configure routers to achieve the limited performance levels with adequate reliability. Without such reliability, systems designers cannot accurately predict the effects of overloads on end-users.

It would, therefore, be desirable to provide a reliable packet-based communication system having enhanced overload performance.

SUMMARY OF THE INVENTION

The present invention provides a packet-based communication system having an active queue management feature that discards arriving packets such that an overloaded link interface provides guaranteed bandwidth to QoS classes that share a buffer. With this arrangement, the system provides reliable overload performance and enhanced end-user satisfaction. While the invention is primarily shown and described in conjunction with a router in a network, it is understood that the invention is applicable to packet-based devices and networks in general having QoS differentiation.

In one aspect of the invention, a packet-based communication system includes an overload control mechanism that provides a guaranteed bandwidth to each class of buffered traffic. In one embodiment, a threshold for each class of traffic is computed so that during overload conditions the throughput of a given class is the smaller of its offered load and the guaranteed bandwidth share for that class. Packets in a given class are discarded when the number of buffered packets in that class exceeds the threshold for that class.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
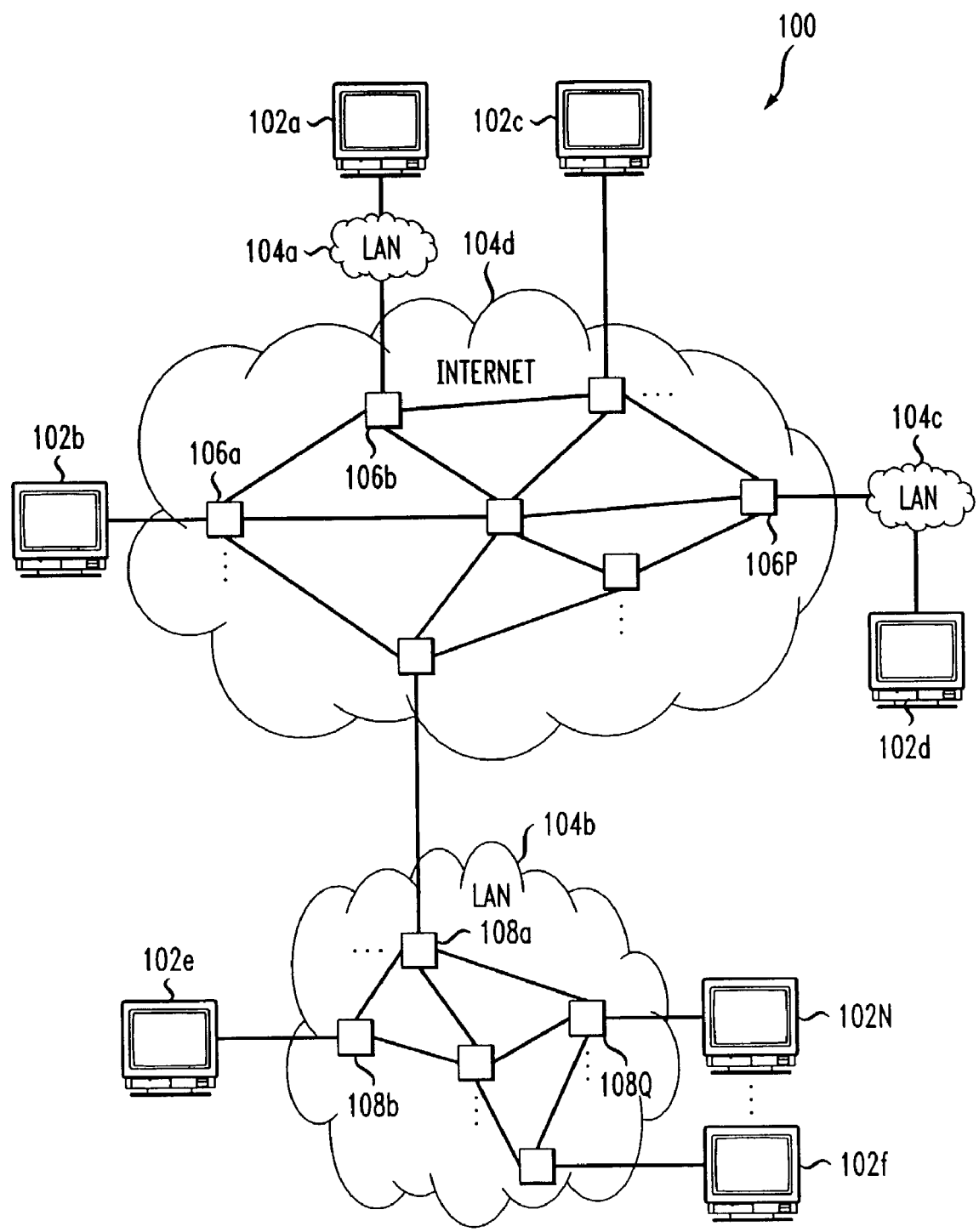
FIG. 1 is a schematic depiction of a packet-based communication system having overload control in accordance with the present invention.

FIG. 1 shows an exemplary packet-based communication system 100 having an overload control mechanism in accordance with the present invention. The system 100 includes a series of end users 102a-N linked via a series of networks 104a-d. In the illustrative embodiment, a series of Local Area Networks 104a-c are coupled to the Internet 104d, which is shown in a simplified form. It will be readily apparent to one of ordinary skill in the art that the number, type and connection of the networks can widely vary to meet the needs of a particular application.

The Internet and the LAN, e.g., LAN 104b, can include one or more routers 106a-P, 108a-Q for routing traffic from point-to-point to support the end-users 102. In general, one or more of the routers 106, 108 provide overload control for a queue that allocates link bandwidth to various Quality of Service (QoS) classes in fixed proportions. As is known in the art, a connection between routers is referred to as a link. As used herein, where N QoS classes are described, it is understood that class 1 traffic is the most preferred (highest priority) and class N traffic is the least preferred.

As described in detail below, the enhanced overload performance provided by the system 100 is achieved by keeping track of the number of packets in the buffer for each QoS class and discarding new packets from a given class when the current number of packets in that class exceeds a given threshold. The active queue management feature of the present invention discards arriving packets such that an overloaded link interface provides guaranteed bandwidth to QoS classes that share a single buffer.

Figure 2:
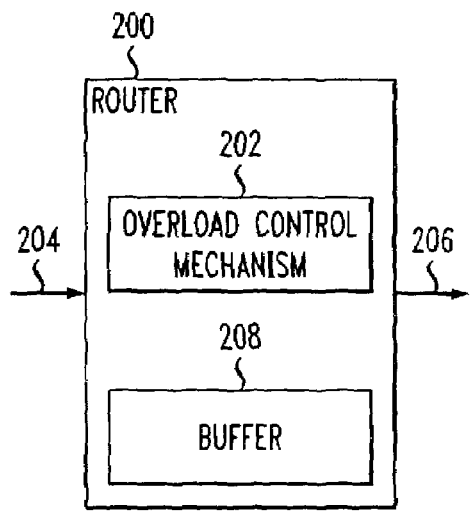
FIG. 2 is a schematic depiction of a router having an overload control mechanism in accordance with the present invention.

In one embodiment shown in FIG. 2, a router 200 includes a router control mechanism 202 in accordance with the present invention. The router 200 includes one or more input ports 204 and one or more output ports 206. Providing a path for data from an input port to an output port is well known to one of ordinary skill in the art. The router 200 further includes a buffer or queue 208 for holding data packets until transmission over a link via an output port 206. As described below, the overload control mechanism 202 maintains a count of the number of stored packets for each class of traffic and selectively discards packets under overload conditions.

Initially, a series of thresholds TH_1, TH_2, . . . , TH_N for a predetermined number N of QoS classes are computed. In general, the thresholds are computed so that, under overload conditions, the throughput of a given class of traffic, e.g., class k, is at least the smaller of its offered load and the guaranteed bandwidth share for class k. The overload control mechanism 202 keeps track of the total number of packets ($Q_{total}$) in the buffer 208 and the number of packets of class k in the buffer ($Q_k$), where k=1, 2, . . . , N-1. class k packets are discarded when $Q_k$>TH_K. class N packets are discarded when $Q_{total}$>TH_N.

Figure 3:
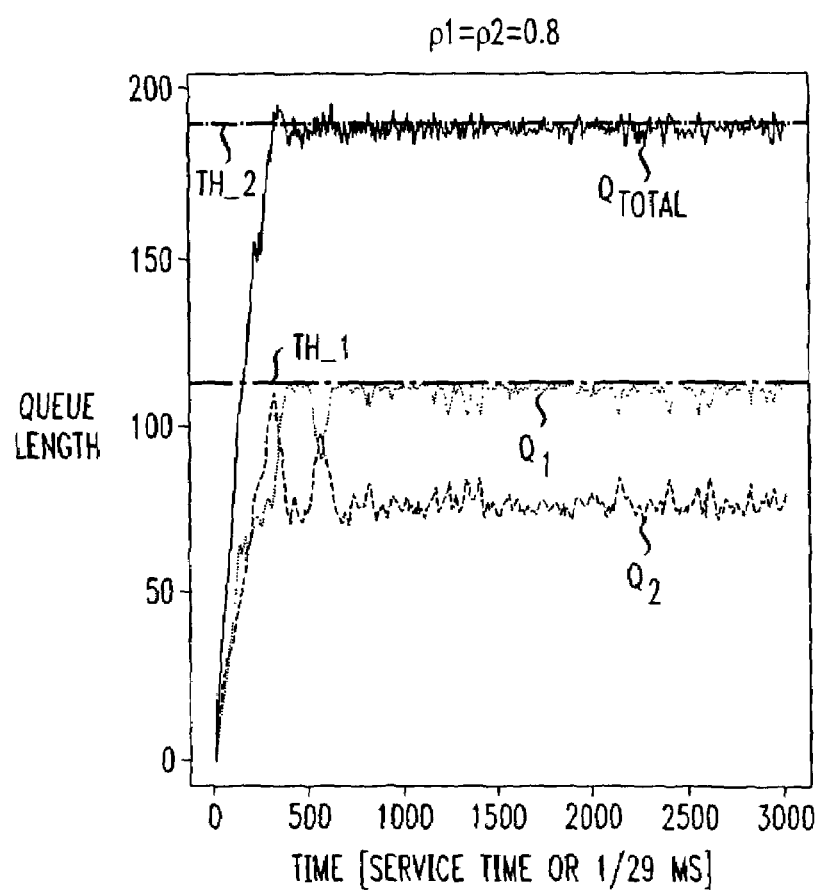
FIG. 3 is a graphical depiction of queue length over time for the overload control mechanism of FIG. 2.

Further details of the inventive overload control mechanism are shown and described in FIG. 3 in conjunction with FIG. 2. Here first and second thresholds TH_1, TH_2 for first and second classes of traffic are shown. As shown in FIG. 3, under overload conditions, the number of buffered class 1 packets Q1 hovers around the first threshold TH_1 and the total number of buffered packets $Q_{total}$ hovers around the second threshold TH_2. There are no buffer overflows when the second threshold TH_2 is slightly less than the buffer size. The fraction of delivered packets from class 1 is TH_1/TH_2.

It will be readily apparent to one of ordinary skill in the art that parameters for optimal performance of the inventive overload scheme can be derived in a variety of ways. In general, the parameters should be selected to allocate link bandwidth to QoS classes in fixed proportions and discard packets from a given class based upon an optimal threshold level.

In one particular two-traffic-class embodiment, a lower bound on the class 2 bandwidth during periods of congestion is $1-\xi_1$, where $\xi_1$ represents the largest throughput that class 1 can use during overload conditions. The second threshold TH_2 can be set to the buffer size minus a predetermined number of packets, e.g., TH_2=BUFFER_SIZE-10. This ensures that, with relatively high probability, the buffer has space for TH_1 class 1 packets. The first threshold TH_1 can then be set to $\xi_1$*TH_2.

Let $\rho_j$ represent the throughput, as a share of the total bandwidth, that class j traffic offers, $\theta_1$ represent the throughput that class 1 achieves, and $\xi_1$ represent the largest throughput that class 1 can use during overload conditions.

Supposing, $\rho_1+\rho_2>1$ and $\rho_1>\xi_1$, the general overload condition implies that $E(Q_1)+E(Q_2) \cong TH\_2$, where E is the expectation operator. These approximations and Little's Law imply that $E(Q_1) \cong \theta_1$*TH_2. Thus, the first threshold TH_1 can be set such that TH_1=$\xi_1$*TH_2, which implies that $\theta_1 \cong \xi_1$.

When $\rho_1+\rho_2<1$, the queue lengths are relatively small and the first and second thresholds TH_1, TH_2 do not have any effect as long as the first threshold TH_1 is not "too" small. Thus, $\theta_1=\rho_1$ and $\theta_2=\rho_2$. An illustrative preliminary first threshold TH_1 is greater than or equal to about fifty packets.

Figure 4:
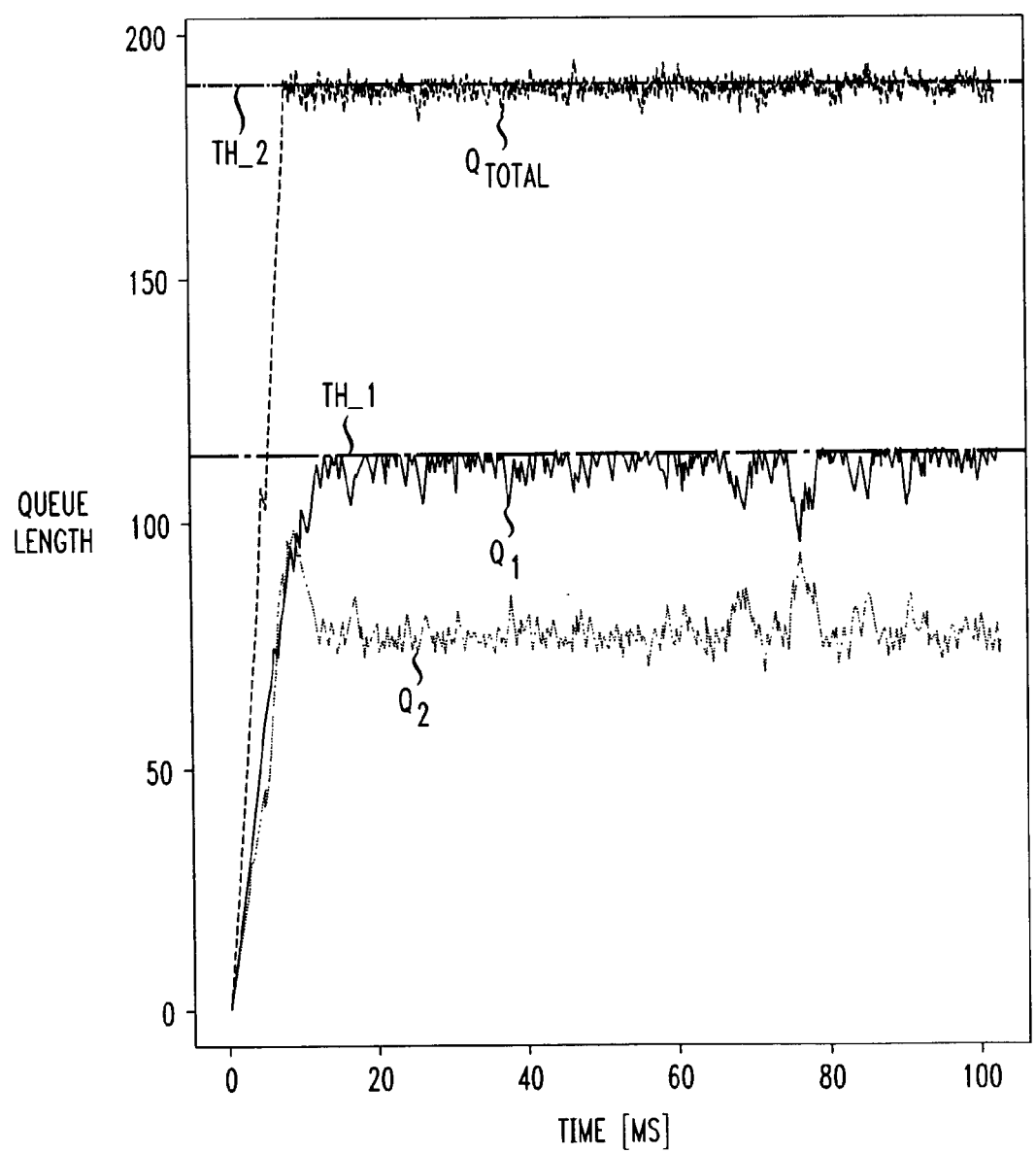
FIG. 4 is a graphical depiction of overload control operation during overload conditions in accordance with the present invention.
Figure 4A:
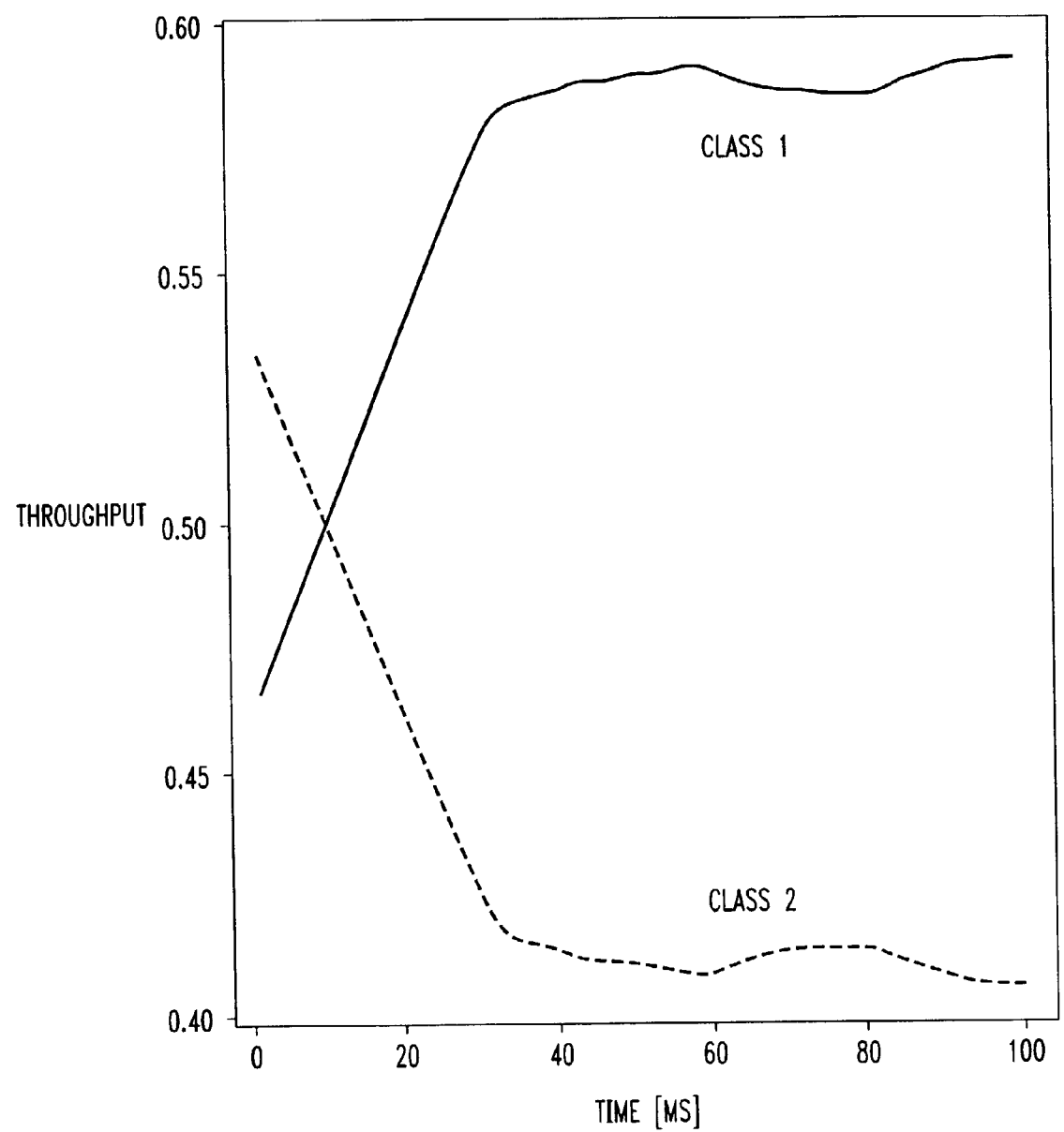
FIG. 4A is a graphical depiction of throughput over time for class 1 and class 2 traffic having an overload control mechanism in accordance with the present invention.

FIG. 4 shows the queue length over time for class 1 traffic with bounding selected to achieve at most 60 percent of available packet bandwidth used by class 1. Buffered class 1 traffic $Q_1$, buffered class 2 traffic $Q_2$, and the total buffered traffic $Q_{total}$ are shown. The queue lengths are shown for an exemplary system having a buffer of 200, a first threshold of 114 and a second threshold of 190. The offered loads are $\rho_1$=0.8 and $\rho_2$=0.8. The queue lengths $Q_1$ and $Q_{total}$ become close to TH_1 and TH_2, respectively. FIG. 4A shows that the throughputs become close to 0.6 for class 1 and 0.4 for class 2.

Figure 5:
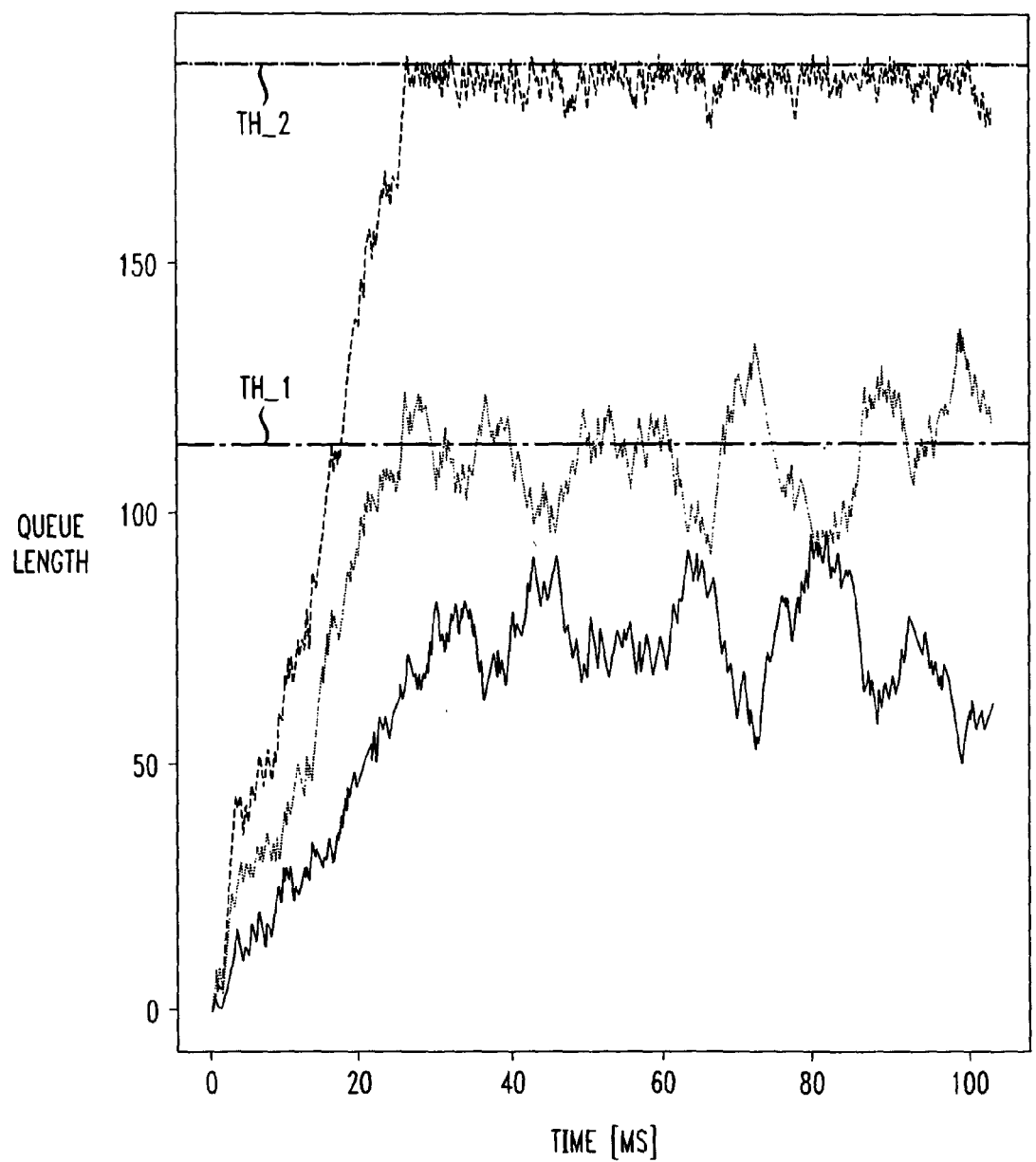
FIG. 5 is a graphical depiction of overload control operation during less then overload conditions in accordance with the present invention.

Now suppose that $\rho_1$=0.4, which is less than $\xi_1$, and $\rho_2$ remains at 0.8. That is, the class 1 traffic is not in an overload condition. As shown in FIG. 5, the first threshold TH_1 is selected so as to not throttle traffic when class 1 traffic is under control, i.e., $Q_1$ is always below the first threshold TH_1. The throughput of class 1 is 0.4.

The overload control feature of the present invention can be readily expanded to included three classes of traffic. For example, where $\xi_j$ is the throughput bound for class j traffic for j=1, 2, the third threshold TH_3 can be set to BUFF- ER_SIZE-10. The second threshold can be set as TH_2=$\xi_2$*TH_3, and the first threshold can be set as TH_1=$\xi_1$*TH_3. In one particular embodiment, $\xi_1$=0.30 and $\xi_2$=0.60. Further traffic classes can added as desired.

Figure 6:
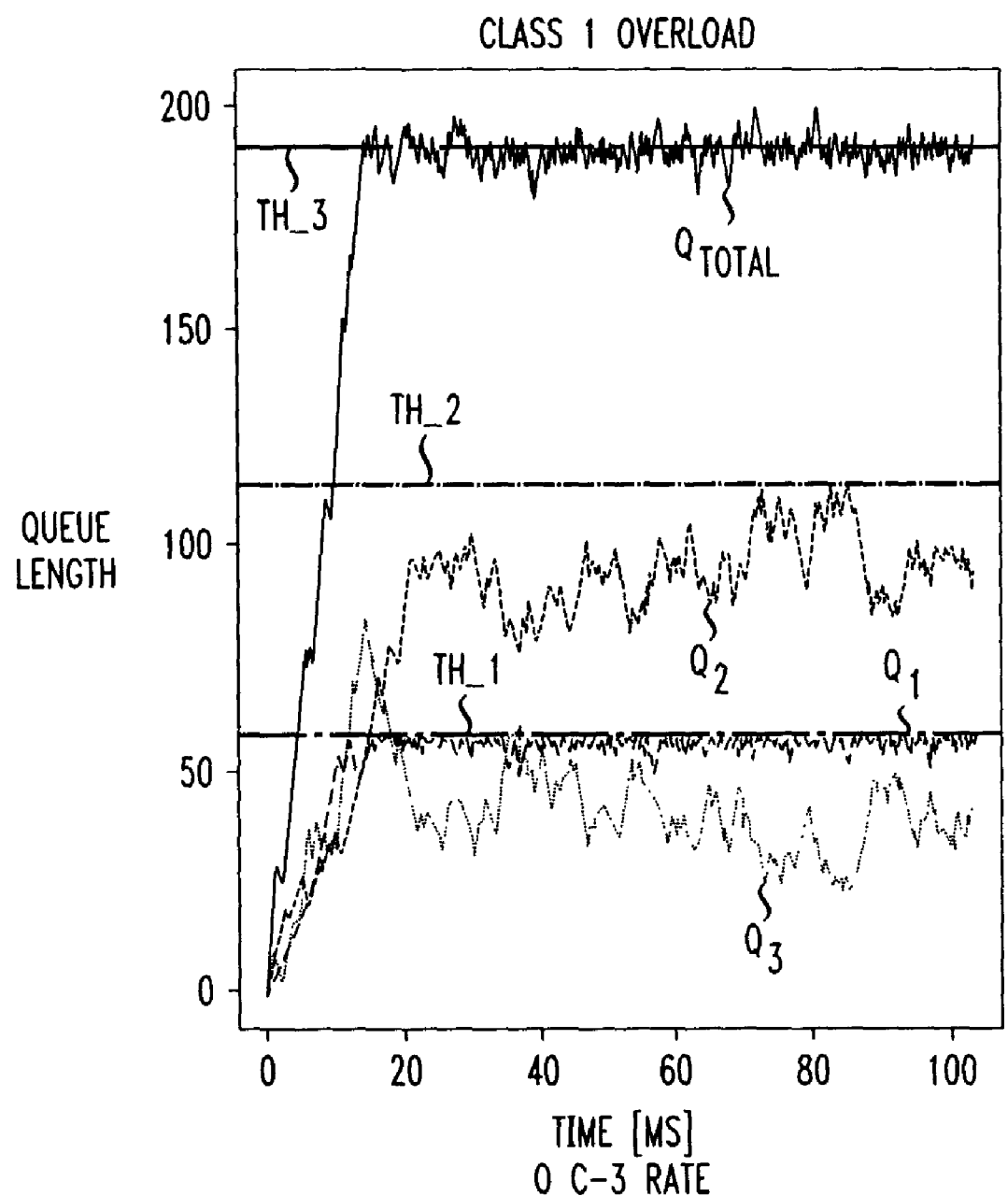
FIG. 6 is a graphical depiction of overload control operation during class 1 overload conditions in accordance with the present invention.
Figure 7:
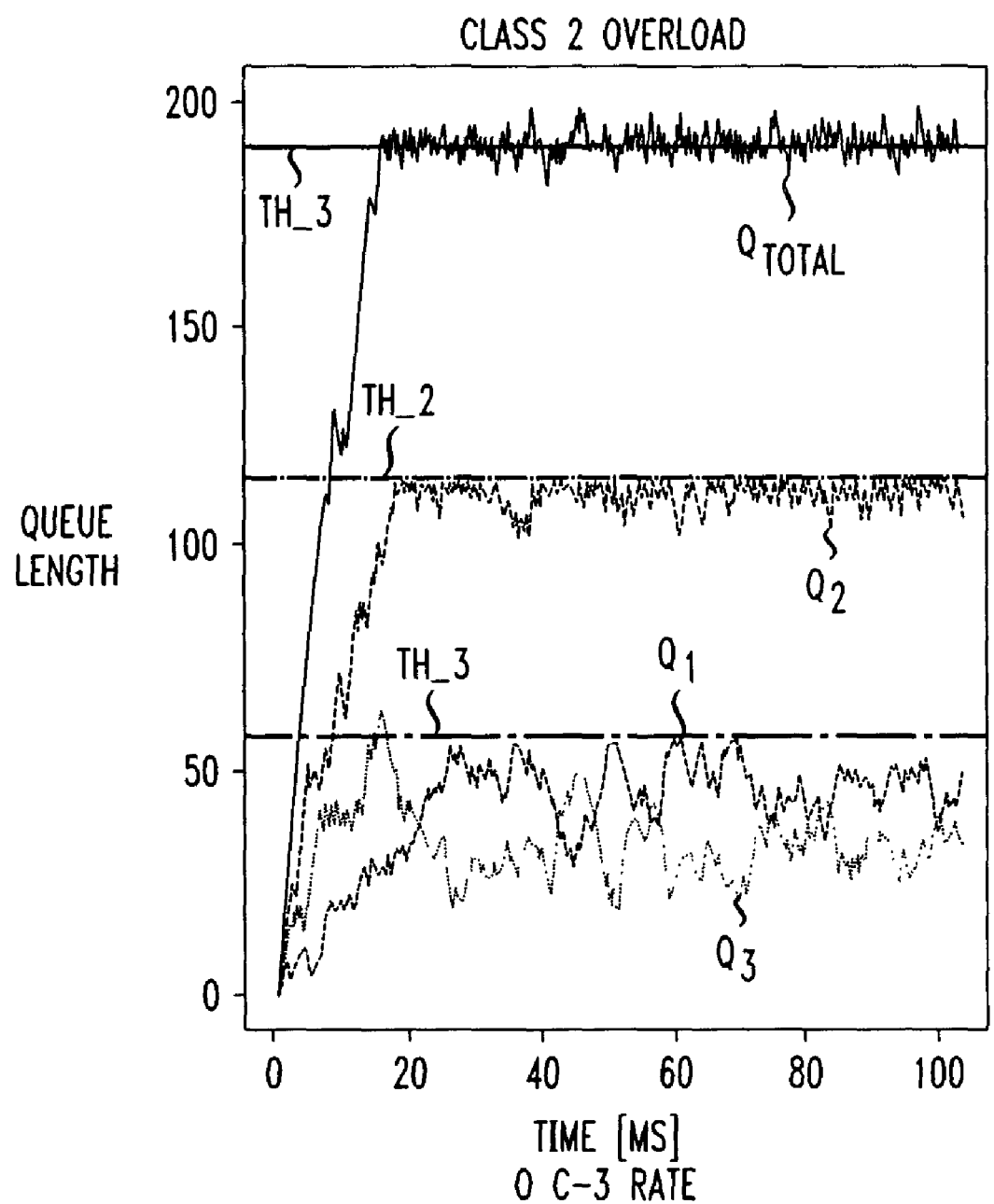
FIG. 7 is a graphical depiction of overload control operation during class 2 overload conditions in accordance with the present invention.
Figure 8:
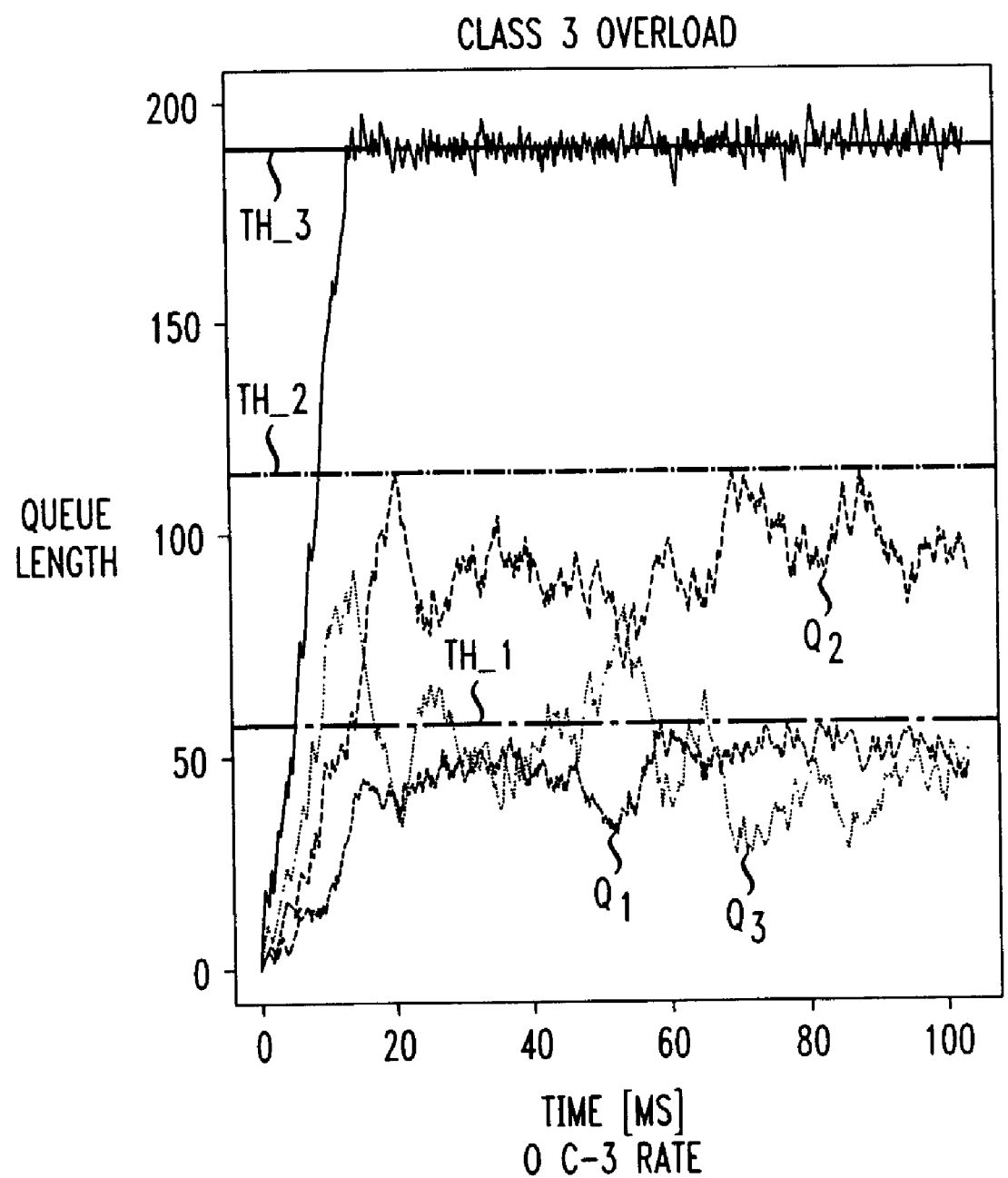
FIG. 8 is a graphical depiction of overload control operation during class 3 overload conditions in accordance with the present invention.

FIGS. 6, 7, 8 show class 1 overload, class 2 overload and class 3 overload, respectively. In FIG. 6, the class 1 overload is shown with queue length over time for an OC-3 rate, which corresponds to 156 Mbits per second. The first threshold TH_1 is 57, the second threshold TH_2 is 114, and the third threshold TH_3 is 190. The offered loads are each 0.50, e.g., $\rho_1$=$\rho_2$=$\rho_3$=0.50. The class 1 traffic has a throughput of about 0.294 (0.030 calculated), the class 2 traffic has a throughput of about 0.494 (0.50 calculated), and the class 3 traffic has a throughput of about 0.212 (0.20 calculated). As can be seen, the class 1 traffic $Q_1$ hovers at the first threshold TH_1 of 57 because $\rho_1$>0.50; this makes $\theta_1$ about $\xi_1$=0.30. The class 2 traffic $Q_2$ stays below the second threshold TH_2 of 114 because $\rho_2$<0.60; this makes $\theta_2$ about $\rho_2$=0.50. The total traffic $Q_{total}$ hovers at the third threshold TH_3 of 190 because $\theta_1+\theta_2+\rho_3$>1.0; this makes $\theta_3$ about $1-\theta_1-\theta_2$=0.20.

Similarly, FIG. 7 shows a class 2 overload with respective loads $\rho_1$=0.25, $\rho_2$=0.75, and $\rho_3$=0.50. The throughputs for class 1, class 2 and class 3 respectively, are 0.239 (0.25 calculated), 0.587 (0.60 calculated), and 0.174 (0.15 calculated). As can be seen, the class 1 traffic $Q_1$ stays below the first threshold TH_1 of 57 because $\rho_1$<0.30; this makes $\theta_1$ about $\rho_1$=0.25. The class 2 traffic $Q_2$ hovers at the second threshold TH_2 of 114 because $\rho_2$>0.60; this makes $\theta_2$ about $\xi_2$=0.60. The total traffic $Q_{total}$ hovers at the third threshold TH_3 of 190 because $\theta_1+\theta_2+\rho_3$>1.0; this makes $\theta_3$ about $1-\theta_1-\theta_2$=0.15.

FIG. 8 shows a class 3 overload with respective loads $\rho_1$=0.25, $\rho_2$=0.50, and $\rho_3$=0.75. The throughputs for class 1, class 2, and class 3 respectively are 0.253 (0.25 calculated), 0.497 (0.50 calculated), and 0.250 (0.25 calculated). As can be seen, the class 1 traffic stays below the first threshold TH_1 of 57 because $\rho_1$<0.30; this makes $\theta_1$ about $\rho_1$=0.25. The class 2 traffic stays below the second threshold TH_2 of 114 because $\rho_2$<0.60; this makes $\theta_2$ about $\rho_2$=0.50. The total traffic $Q_{total}$ hovers at the third threshold TH_3 of 190 because $\theta_1+\theta_2+\rho_3$>1.0; this makes $\theta_3$ about $1-\theta_1-\theta_2$=0.25.

The present invention provides an overload control mechanism that enhances overall overload condition performance for a packet-based system and provides reliable operation. By selecting class thresholds, link bandwidth can be allocated to QoS classes in fixed proportions.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of controlling overload in a packet-based system, comprising:
   determining a first threshold TH_1 corresponding to a guaranteed bandwidth level for a first class of traffic and a second threshold TH_2 corresponding to a guaranteed bandwidth level for a second class of traffic, where the first class of traffic has a higher priority than the second class of traffic;
   computing a number of first class packets in a buffer and a total number of packets in the buffer, the total number of buffered packets including packets of the first class and packets of the second class; and
   discarding second class packets when a number of buffered second class packets is greater than the second threshold, wherein the second threshold is selected by subtracting a number of packets from a total size of the buffer and the first threshold is selected according to the equation TH_1=$\xi_1$*TH_2, where $\xi_1$ is the guaranteed share of the bandwidth for the first class.

2. The method according to claim 1, further including discarding first class packets when the number of buffered first class packets is greater than the first threshold.

3. The method according to claim 1, further including allocating link bandwidth in fixed proportions for the first class traffic and the second class traffic.

4. The method according to claim 1, further including buffering the first and second class packets in the same buffer.

5. The method according to claim 1, wherein the total number of buffered packets is computed by an overload control mechanism of a router.

6. The method according to claim 1, further including buffering further classes of traffic.

7. The method according to claim 1, wherein a fraction of transmitted first class packets corresponds to a ratio of the first and second thresholds.

8. The method according to claim 1, further including:
   determining a third threshold corresponding to a guaranteed bandwidth level for a third class of traffic;
   computing a number of third class packets in the buffer; and
   discarding third class packets when a number of buffered third class packets is greater than the third threshold.

* * * * *